(12) United States Patent
Stremlau et al.

(10) Patent No.: US 11,959,861 B2
(45) Date of Patent: Apr. 16, 2024

(54) AGRICULTURAL MACHINE WITH AN NIR SENSOR AND DATA PROCESSING SYSTEM

(71) Applicant: CLAAS Selbstfahrende Erntemaschinen GmbH, Harsewinkel (DE)

(72) Inventors: Björn Stremlau, Recke (DE); Carsten Grove, Beelen (DE); Michael Roggenland, Arnsberg (DE); Frank Claussen, Harsewinkel (DE); Maximilian von Nordheim, Bielefeld (DE); Jeremias Hagel, Münster (DE); Jörg Wesselmann, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 380 days.

(21) Appl. No.: 17/487,727

(22) Filed: Sep. 28, 2021

(65) Prior Publication Data

US 2022/0099584 A1    Mar. 31, 2022

(30) Foreign Application Priority Data

Sep. 29, 2020   (DE) .................... 102020125434.2

(51) Int. Cl.
*G01N 21/84* (2006.01)
*G01J 5/02* (2022.01)
(Continued)

(52) U.S. Cl.
CPC ............ *G01N 21/84* (2013.01); *G01J 5/02* (2013.01); *G01N 21/359* (2013.01); *G06T 7/90* (2017.01);
(Continued)

(58) Field of Classification Search
CPC ...... G06N 20/00; G06N 5/04; G06Q 10/0631; G06T 7/0012; G06V 2201/03
See application file for complete search history.

(56) References Cited

U.S. PATENT DOCUMENTS 7,440,901 B1 * 10/2008 Dlott ...................... G06Q 10/10
235/375
8,282,796 B2 * 10/2012 Tao ........................ C25B 11/043
252/502

(Continued)

FOREIGN PATENT DOCUMENTS

| DE | 102008056557 A1 | 5/2010 |
| EP | 2545761 A1 | 1/2013 |
| EP | 3366104 A1 | 8/2018 |

OTHER PUBLICATIONS

Foss: "Best Practice Example for Calibrating NIR Devices with Global Models", Jun. 1, 2018 (Jun. 1, 2018), XPO55881988, Obtained: URL:https://www.fossanalytics.com/-/media/files/documents/papers/feed-and-forage-seqment/guide-calibration-best-practice-de.pdf.

(Continued)

*Primary Examiner* — Yosef Kassa
(74) *Attorney, Agent, or Firm* — Lempia Summerfield Katz LLC

(57) ABSTRACT

An agricultural machine is disclosed that includes an NIR sensor configured to detect NIR spectra of plant material and output them as raw data, an evaluation unit configured to derive at least one parameter of the plant material in real time from the raw data, and an interface for the data traffic with at least one data processing unit outside of or external to the agricultural machine that is configured to transmit the raw data to the data processing unit.

18 Claims, 3 Drawing Sheets

(51) Int. Cl.
    *G01N 21/359*    (2014.01)
    *G06T 7/90*    (2017.01)
    *A01G 7/00*    (2006.01)
    *G01J 5/00*    (2022.01)

(52) U.S. Cl.
    CPC ......... *A01G 7/00* (2013.01); *G01J 2005/0077* (2013.01); *G01N 2021/8466* (2013.01); *G06T 2207/10048* (2013.01); *G06T 2207/30188* (2013.01)

(56) References Cited

U.S. PATENT DOCUMENTS

| | | | | |
|---|---|---|---|---|
| 8,381,501 | B2* | 2/2013 | Koselka | A01D 91/00 |
| | | | | 701/50 |
| 8,788,286 | B2* | 7/2014 | Kenedy | G16H 50/20 |
| | | | | 705/2 |
| 9,697,482 | B2* | 7/2017 | Dlott | G06Q 10/063 |
| 10,593,040 | B2* | 3/2020 | Zouridakis | G06T 7/0012 |
| 11,109,537 | B2 | 9/2021 | Neitemeier et al. | |
| 2010/0121541 | A1 | 5/2010 | Behnke et al. | |

OTHER PUBLICATIONS

European Search Report for European application No. 21189042.1-1004 dated Jan. 28, 2022.

\* cited by examiner

AGRICULTURAL MACHINE WITH AN NIR SENSOR AND DATA PROCESSING SYSTEM

CROSS REFERENCE TO RELATED APPLICATION

This application claims priority under 35 U.S.C. § 119 to German Patent Application No. DE 102020125434.2 filed Sep. 29, 2020, the entire disclosure of which is hereby incorporated by reference herein.

TECHNICAL FIELD

The present invention relates to an agricultural machine, in particular a harvester such as a combine or a forage harvester, with an NIR sensor and a data processing system that comprises one or more of these machines.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Near-Infrared (NIR) sensors measure the amount of the light transmitted or reflected by a sample in the near infrared range. Organic substances generally have structure-rich absorption or reflection spectra within this spectral range due to the excitation of oscillations of bonds between atoms in these substances.

DE 10 2004 048 103 B4 discloses an NIR sensor head for use in an agricultural machine (interchangeably termed an agricultural work machine). The sensor head comprises a lighting source to illuminate material to be investigated, a spectrometer assembly as an NIR sensor, a processor for detecting and processing the measured values, and an interface with a bus system of the agricultural machine that may optionally output measuring results or raw data for further processing to the bus system of the agricultural machine. Parameters may be derived from the obtained data, such as on the basis of a suitable calibration, with parameters including moisture, protein, starch or oil content, cutting length, fibrous state or temperature.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
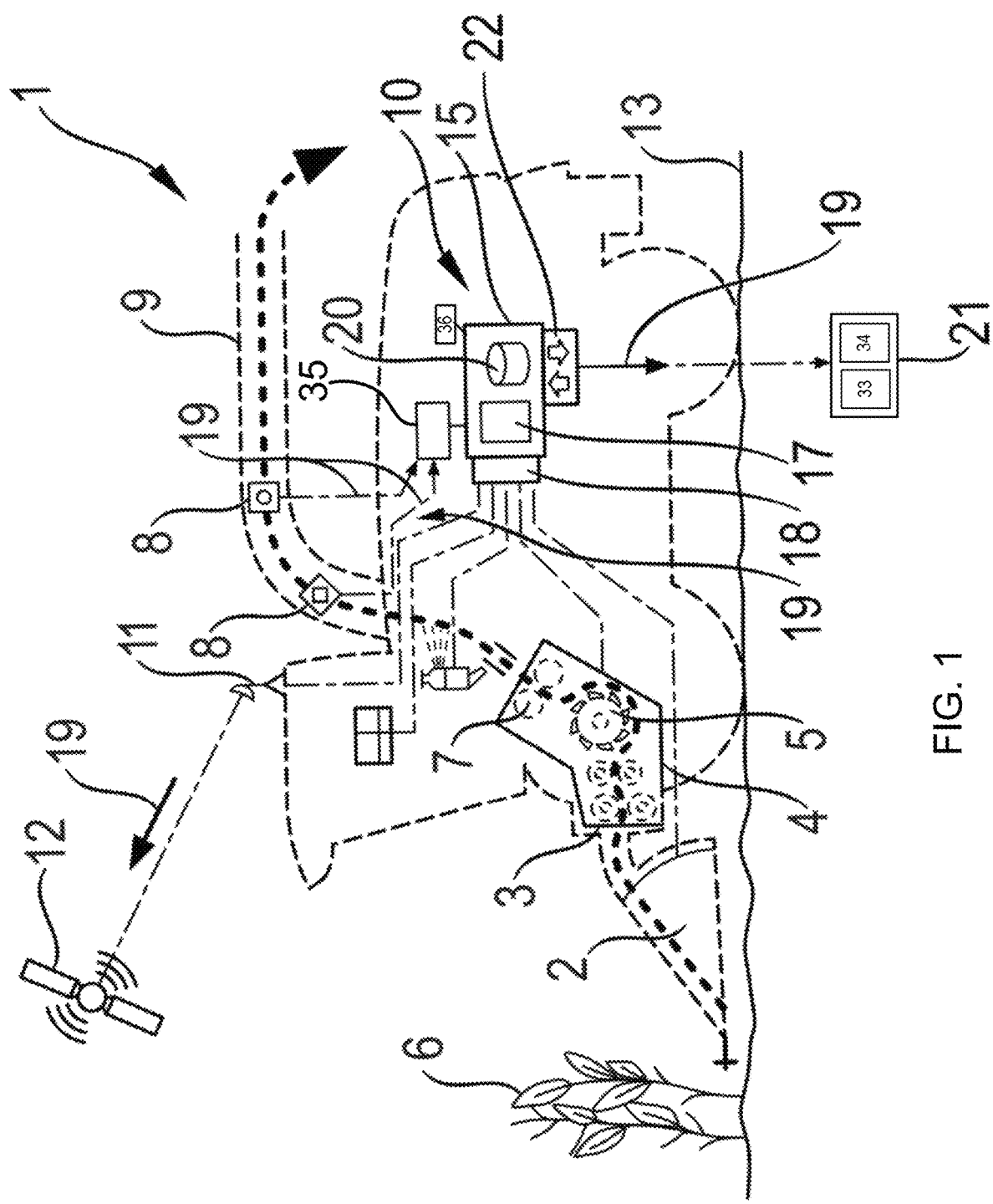
FIG. 1 illustrates an agricultural machine with an NIR sensor.

As discussed in the background, NIR sensors measure the amount of the light transmitted or reflected by a sample in the near infrared range. Within this spectral range, there are however no distinctive lines that could be assigned to a specific chemical compound; instead, most every organic compound has C—C bonds and C—H bonds whose lines may be shifted slightly from one substance to the other from interactions with adjacent atoms, but they are also so widespread that the shifts may be difficult to identify. Accordingly, the number of degrees of freedom in which the NIR spectra may distinguish different compounds from each other is generally much less than the number of compounds that may be contained in the sample. To be able to extract useful information on the composition of a sample from an NIR spectrum, far-reaching assumptions may be made beforehand about the nature of the sample, and the correctness of these assumptions may determine the validity of the information obtained from the spectrum. In practice, this means that to be able to draw conclusions on important components of a grain sample by analyzing an NIR sample, the type and variety of grain should be known as well as potentially any other influential variables in order to be able to choose an appropriate calibration model for the sample. The optimization of these calibration models is the subject of intensive development. Results obtained by using various calibration models may not be readily comparable with each other.

Also, DE 10 2004 048 103 B4, referenced in the background, does not disclose any information on the way in which the processor further processes the raw data into measured values, or how the raw data are processed by a receiver connected to the bus. In this case as well, the problem exists that measuring results may be of dubious quality when they are obtained with an unsuitable or outdated calibration model.

Comparability of evaluation results over several years is however desirable in order to assess, for example, the effectiveness of various measures, such as upkeep measures (e.g., fertilization, pest control, etc.) and responsive to the assessment of the effectiveness of various measures, be able to optimize their scope.

Thus, in one or some embodiments, an agricultural machine is disclosed with an NIR sensor that enables such comparability.

In one or some embodiments, the agricultural machine includes an NIR sensor configured to detect one or more NIR spectra of plant material and output the detected one or more NIR spectra as raw data and an evaluation unit configured to receive the raw data and to derive at least one parameter of the plant material in real time from the raw data. The agricultural machine may further include an interface that is configured to transmit the raw data (e.g., indications of the raw data that are suitable for transmission) to a data processing unit that is external to the agricultural machine. Accordingly, data that were gathered about a given field area and crop, collected over several years and if needed evaluated with the same calibration module, and the effectiveness of cultivation measures pursued over various years, may be evaluated in the data processing unit by comparing the evaluation results. Moreover, the raw data in the data processing unit may be used to optimize calibration models used in the agricultural machine from which they were provided or in other machines, or to create new calibration models if needed.

In particular, sensor data, such as raw data of one or more NIR spectra, may be supplemented in one or more ways, such as performing any one, any combination, or all of associating location data, encoding the one or more NIR spectra, or associating check data. Thus, the raw data may remain intact but may be supplemented and/or modified (though the raw data may remain or may be mathematically, such as via decoding, revert to the original raw data). The raw data (with or without any one, any combination, or all of associating location data, encoding the one or more NIR spectra, or associating check data) may be transmitted (e.g., in real time, periodically, or after completing a harvest operation) external to the forage harvester, such as to the data processing unit. In turn, the data processing unit may analyze the transmitted raw data, such as to determine amount(s) of substances in the harvested material. Further, in one or some embodiments, the data processing unit may analyze the raw data in combination with the associated data (e.g., the location data and/or the check data), as discussed below. Thus, the different elements resident on the forage harvester and remote from the forage harvester may perform different actions in combination.

In one or some embodiments, so that these calibration models may also benefit from the work of the agricultural machine that supplies the raw data needed for their creation, the evaluation unit may be configured to use an exchangeable calibration model to derive the at least one parameter. On the one hand, this for example enables a device (such as the data processing unit) to create calibration models especially for the NIR sensor of the agricultural machine taking into account its individual properties in order to thereby optimize its performance (e.g., the data processing unit may generate specific calibration model(s) that are tailored to the NIR sensor on the particular forage harvester); on the other hand, a device (such as the data processing unit) may use large amounts of raw data that originate from or are generated by various machines, and in turn may reliably recognize and uniformly use commonalities in the measuring characteristics from their various sensors as a basis in the evaluation of all sensors.

Usefully, in one or some embodiments, the same interface with which the raw data are transmitted from the agricultural machine to the data processing unit may also serve to upload new calibration models in the reverse direction from the data processing unit to the evaluation unit of the agricultural machine.

In addition to the raw data, the interface may be configured to transmit values of the at least one parameter derived from the evaluation unit. On the one hand, the compatibility with systems already widespread in agriculture may thereby be ensured that only provide evaluation results from a machine-supported evaluation unit to a stationary data processing unit; on the other hand, by using the same transmission path for the evaluation results and for the raw data, the amount of work for an operator of the agricultural machine may be reduced or minimized. This is of particular importance when the operator of the agricultural machine does not himself or herself derive any direct benefit from the provision of the raw data.

The agricultural machine may have a processing aggregate (e.g., one or more functionality for processing) for processing the plant material such as a threshing or cutting mechanism. The data obtained in real time from the evaluation unit may be used to adapt or modify at least one operating parameter of the processing aggregate to the condition of the harvested material that may be variable on an adjoining field area depending on the soil quality or other circumstances.

Such a parameter, which may influence the energy expended while performing a processing operation (e.g., threshing or chopping), may for example be the water content of the plant material or a parameter representative of the maturity of the plant material.

In one or some embodiments, the agricultural machine comprises a timer and/or a device for positioning such as a satellite navigation device. Responsive thereto, the evaluation unit may be configured to add (e.g., correlate to) times and/or locations of where the times and/or locations were generated to the NIR spectra. In turn, the raw data (such as indications of the raw data) may be transmitted to the data processing unit, including indications of the NIR spectra and the correlated one or both of the times or locations. By using the times, the data processing unit may determine the location belonging to a received spectrum and save it with the spectrum outside of the agricultural machine when it knows the trajectory of the agricultural machine, for example from a previous route plan. The knowledge of the location at which a spectrum arose enables location-dependent optimization of the cultivation measures (e.g., in one embodiment, the data processing unit may perform such analysis).

The interface may be configured to transmit the raw data in an integrity-protected form, for example encoded or linked to test information that is calculated from the raw data according to secret or private instructions (e.g., by using software to perform the encoding), and that supplies a deviating result in the event of a change to the raw data. Accordingly, this may act as a data check such that the data processing unit outside of the agricultural machine may be certain that the data have not been changed. This may be important when the data are used to set a selling price for the plant material.

In one or some embodiments, the interface is configured to transmit the raw data via a wireless link. Accordingly, the personnel operating the agricultural machine may be spared from establishing a physical transmission link or handling a data carrier. It is however also contemplated for the interface to comprise an exchangeable data carrier on which the raw data collected during a use of the agricultural machine are collected, and that is removed from the agricultural machine after use in order to be connected to the data processing unit outside of the agricultural machine and read out.

In one or some embodiments, the interface may be designed to transmit the raw data in real time; in the event that the agricultural machine moves outside of the range of the wireless link, a data buffer may be provided to collect the raw data until the link is available once again (after which, the data transmission via the interface is resumed).

In one or some embodiments, the data processing system includes a data processing unit that interacts with at least one agricultural machine as described above whose interface is configured to transmit the raw data to the data processing unit. The data processing unit may be configured to generate a calibration model for deriving at least one parameter of the plant material by using the raw data. The larger the number of the agricultural machines participating in the data processing system, the larger the amounts of raw data that may be compiled in the data processing unit over a short time. This makes it possible to create calibration models in the data processing unit based on large amounts of data so that statistical errors in generating the model may be largely suppressed by averaging, or the influence of numerous variables on the parameters of the plant material to be determined may be investigated and taken into account to create models specific to certain values of these variables.

The models created in this manner may be downloaded from the data processing unit to the agricultural machines for use therein. The downloaded models may comprise updated or replacement calibration models to update or to replace existing calibration models, thereby enabling a more precise, faster or otherwise improved determination of parameters that were already determined by previously available models. Alternatively, or in addition, the downloaded models may expand the functional spectrum of the agricultural machine with the determination of new parameters.

Referring to the figures, FIG. 1 illustrates a forage harvester 1 in a schematic, partially cut-away side view while harvesting a crop of plants 6, such as corn plants, on a field. In a manner known per se, the forage harvester 1 has a harvesting header 2 that may be exchanged to adapt to the plant material for harvesting, and that cuts and picks up the plant material S to supply it to a chopping unit 4. An example forage harvester is disclosed in U.S. Pat. No. 11,109,537, incorporated by reference herein in its entirety.

The chopping unit 4 comprises a conveying apparatus with a plurality of roller pairs 3 that pick up the plant material from the harvesting header 2, a rotatably driven cutter head 5 that interacts with a stationary cutting edge in order to comminute the plant material S in a first processing step, and a corn cracker 7. After running through the corn cracker 7, the plant material S, driven by a postaccelerator, reaches a discharge chute 9. The adjustable operating parameters include any one, any combination, or all of: a gap width between the cutting edge and the cutter head; the delivery speed of the roller pair 3 and rotational speed of the cutter head 5; the ratio between the delivery speed of the roller pair 3 and rotational speed of the cutter head 5; the gap width of the corn cracker 7; or the blowing output of the postaccelerator.

An IR light source and an NIR sensor 8 for monitoring the condition of the plant material S may be provided, installed or positioned at various locations along the path of the plant material S by the forage harvester 1, such as at locations at which the plant material to be monitored is shielded from visible external light and IR radiation. FIG. 1 shows an example of two NIR sensors 8 that are arranged or positioned on the discharge chute 9 to monitor the condition of the chopped plant material passing through.

Figure 2:
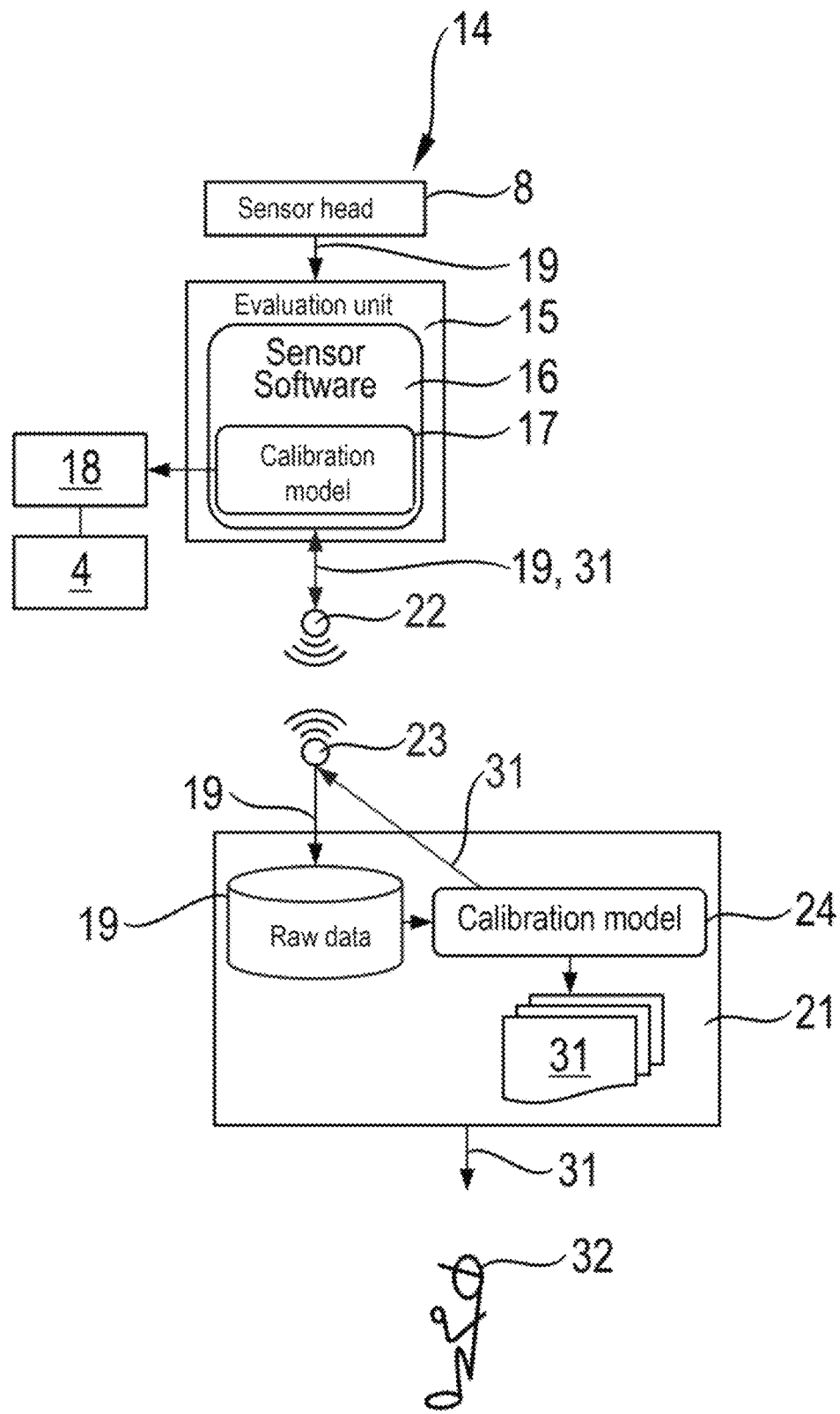
FIG. 2 illustrates a block diagram of the NIR sensor and an evaluation unit.

The NIR sensors 8 are connected, via a sensor interface 35, to (e.g., in electronic communication to transfer information) an evaluation unit 15 that is on board and resident in the forage harvester 1 and receives the sensor data, such as the raw data 19 in the form of spectra emitted by the NIR sensors 8. FIG. 2 is a block diagram of an NIR sensor 8, the evaluation unit 15, and units interacting therewith inside (e.g., resident with) and outside (e.g., external to, such as remote from) of the forage harvester 1. The evaluation unit 15 may be part of an onboard computer 10 of the forage harvester 1 or combined with the NIR sensor into an assembly. Onboard computer 10 may include computing functionality, such as at least one processor and at least one memory (not shown), which may be the same or similar to processor 33 and memory 34 discussed below, and which may include a timer 36 (for input to generate a time at which to correlate with the NIR spectra data). As shown in FIG. 1, the timer 36 is separate from onboard computer 10. Alternatively, the timer 36 may be integrated with onboard computer 10. The computing functionality may be manifested in one of several ways, such as illustrated in FIG. 1 with the evaluation unit, the sensor software 16, the calibration model 17, the control unit 18, and the data memory 20.

In one or some embodiments, the evaluation unit 15 is connected to (such as in electronic communication with) a satellite navigation system 11 on board and resident in the forage harvester 1 that receives signals from navigation satellites 12, such as the GPS or Galileo system, in a known manner in order to determine the geographic position of the forage harvester 1 and use it, for example, to assist with autonomously navigating the forage harvester 1 on the field.

Sensor software 16 runs on the evaluation unit 15. Part of this sensor software 16 is formed by a calibration model 17 which may comprise a subprogram of the sensor software 16 that is selected specific to the user from various models saved in a data memory of the evaluation unit 15, or is downloaded onto the evaluation unit 15 as needed, and is configured to determine (e.g., while harvesting) at least one aspect of the harvested material (e.g., the proportions of individual substances such as protein, fat, and sugar in the harvested material) for any one, any combination, or all of: a specific type of harvested material (selected from a plurality of types of harvested materials); a specific variety of harvested material (selected from a plurality of varieties of harvested materials); or a specific environmental condition (selected from a plurality of environmental conditions). A part of the sensor software 16, such as the calibration model 17, may then forward the results to a control unit 18 of the chopping unit 4 in order for the control unit 18 to control at least one aspect of operation of the chopping unit 4. By using suitable calibration models, other contents may be detected.

Various parameter(s) may be relevant to the operation of the chopping unit 4. For example, one parameter relevant to the operation of the chopping unit 4 may be the percentage of dry matter in the harvested material since this may influence the chopability and therefore may influence any one, any combination, or all of the required drive performance and speed of the cutter heads 5, the hardness of the grains contained in the plant material, the gap width and drive performance of the corn cracker 7, the weight of the chopped parts, or the required performance of the postaccelerator. It is also contemplated to deduce the grain portion by evaluating the amount of starch in the chopped material and to set operating parameters of the corn cracker 7 depending thereupon (e.g., evaluate the amount of starch to determine a current grain portion; compare the current grain portion with a predetermined grain portion; modify one or more operating parameters of the corn cracker 7 in order to modify the current grain portion to be closer to or at the predetermined grain portion). To minimize the requirements on the computing power of the evaluation unit 15, the calibration model 17 may only need to calculate those parameters of the plant material S that are actually used by the control unit 18 to control the chopping unit 4.

One task of the sensor software 16 that depends thereupon is to assign information on the location at which the spectrum was recorded to the spectra received over the course of time by the NIR sensor 8 (e.g., correlating or tagging location data to the sensor data). In this regard, the sensor data, such as the spectra themselves, are not thereby changed so that the designation "raw data" 19 is justified both for the spectra output directly by the NIR sensor 8 as well the spectra with the added location information. The location information may be provided by the satellite navigation system 11.

The sensor software 16 may furthermore encode the spectra or calculate a check date from them according to instructions (such as secret instructions) and add it to the spectra to obtain integrity-secured spectra (e.g., the check data may further be correlated to the sensor data). Since no information is lost by the encoding and the original spectra may be restored by decoding, the integrity-secured spectra may likewise be considered raw data 19.

A data memory 20 may be included in order to act as a data buffer to buffer the possibly integrity-secured spectra with the associated location information until they may be transmitted to a stationary data processing unit 21. To this end, complementary radio interfaces 22, 23, which enable wireless transmission of information, are provided in the forage harvester 1 or in the data processing unit 21. In one or some embodiments, the radio interfaces 22, 23 may be compatible with a public cellular network in order to always allow the transmission of the spectra whenever the forage harvester 1 is located in the coverage area of the cellular network; however, for example, these may also be WLAN interfaces that only allow data transmission when the radio interfaces 22, 23 are in a mutual range, for example in a barn or garage of the operator of the forage harvester 1. The storage capacity of the data memory 20 is dimensioned corresponding to an anticipated amount of data during an interruption of the communication between the radio interfaces 22, 23 and may therefore be smaller when mobile radio interfaces are used than in the case of WLAN interfaces.

In one or some embodiments, the data memory 20 may have sufficient memory capacity for the raw data 19 of a harvesting operation and may be exchangeable in order to be removed after being used and connected to the data processing unit 21; in this case, the data memory 20 itself forms the interface for the data communication between the agricultural machine and the data processing unit 21, and the radio interfaces 22, 23 are not needed. In this regard, various ways to transmit the raw data 19 from the forage harvester 1 to the data processing unit 21 are contemplated.

As shown in FIG. 1, the data processing unit 21 may be a computer on an agricultural farm which owns the forage harvester 1 and/or a field on which it is used; it may also be a computer of a service provider for a plurality of farms, a cloud system, or a combination of the aforementioned. In one or some embodiments, the data processing unit 21 may comprise any type of computing functionality, such as at least one processor 33 (which may comprise a microprocessor, controller, PLA, or the like) and at least one memory 34 in order to perform the disclosed analysis and/or any other processing disclosed herein. The memory 34 may comprise any type of storage device (e.g., any type of memory). Though the processor 33 and memory 34 are depicted as separate elements, they may be part of a single machine, which includes a microprocessor (or other type of controller) and a memory. Examples of computer-readable media include computer-readable non-transitory storage media, such as a random-access memory (RAM), which may be SRAM, DRAM, SDRAM, or the like, read-only memory (ROM) 708, which may be PROM, EPROM, EEPROM, or the like. RAM and ROM hold user and system data and programs, as is known in the art. Thus, the processor 33 and/or the memory 34 may include a computer-readable medium for determining a portion of one or both of broken grain or non-grain components in a stream of harvested material, comprising instructions stored thereon, that when executed on a processor 33, performs any one, any combination, or all of the steps described herein.

The processor 33 and memory 34 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The data processing unit 21 may save various calibration models 24 for different varieties of harvested material as well as, if applicable, service programs for decoding or checking the integrity of the raw data 19. The calibration models 24 may include those for calculating the parameters taken into account or considered by the chopping unit 4 for different varieties of harvested material from which, before a harvesting operation begins, a parameter appropriate for the variety to be harvested is selected and downloaded by means of the radio interfaces 22, 23 to the evaluation unit 15 to serve there as a calibration model 17. In this regard, the data processing unit 21 may select one calibration model 17, from the plurality of calibration models (based on one or both of the variety of harvested material and/or the desired decoding and/or checking of the sensor data) to transmit to the forage harvester 1 for use as the calibration model 17 by the evaluation unit 15. Other calibration models 24 may be provided to calculate the portions of other compounds in the harvested material. The data processing unit 21 is accordingly capable of determining the amounts of any value-determining or otherwise interesting substances in the harvested material by using the raw data 19 transmitted to it without making use of computing power on board the forage harvester 1 to do this.

By using the geographic position data assigned to the NIR spectra in the transmitted raw data 19, the data processing unit 21 may be configured to calculate the aforementioned parameters and amounts of substance in a spatially resolved manner, and to generate maps of their geographic distribution. In turn, these may be used to determine any pesticide or cultivating measures and to perform them with, if applicable, an intensity that depends on the location, for example spreading manure with reference to a requirement determined from the amounts of substance depending on the location in an amount adapted to the location.

The data processing unit 21 may belong to an agricultural farm such as that of the operator of the forage harvester or the owner of the field 13. Alternatively, the data processing unit 21 may be operated by a service provider who works for a plurality of agricultural farms and is therefore able to collect raw data 19 from all of these farms and use the data for developing and optimizing the calibration models.

It is also contemplated for the data processing unit 21 to comprise a plurality of computers including those that belong to an agricultural farm, and to save the data on the areas belonging to the farm and the crops raised thereupon, as well as the calibration models required for these crops and licensed by the farm in order to download them to the agricultural machines or perform local evaluations, as well as a central computer that collects the raw data 19 to use it for the development and optimization of the calibration models. The transmission of the raw data 19 from the forage harvester 1 to the data processing unit 21 may be easily ensured if the same transmission path is used to transmit the data as for parameter values that have already been determined by the evaluation unit 15 of the forage harvester 1. Since these data are important to the agricultural farm, employees of the farm will generally ensure that they may be transmitted to the data processing unit 21, and the raw data 19 may then be transmitted along the same path without this requiring more targeted, additional measures by the personnel of the agricultural farm.

Figure 3:
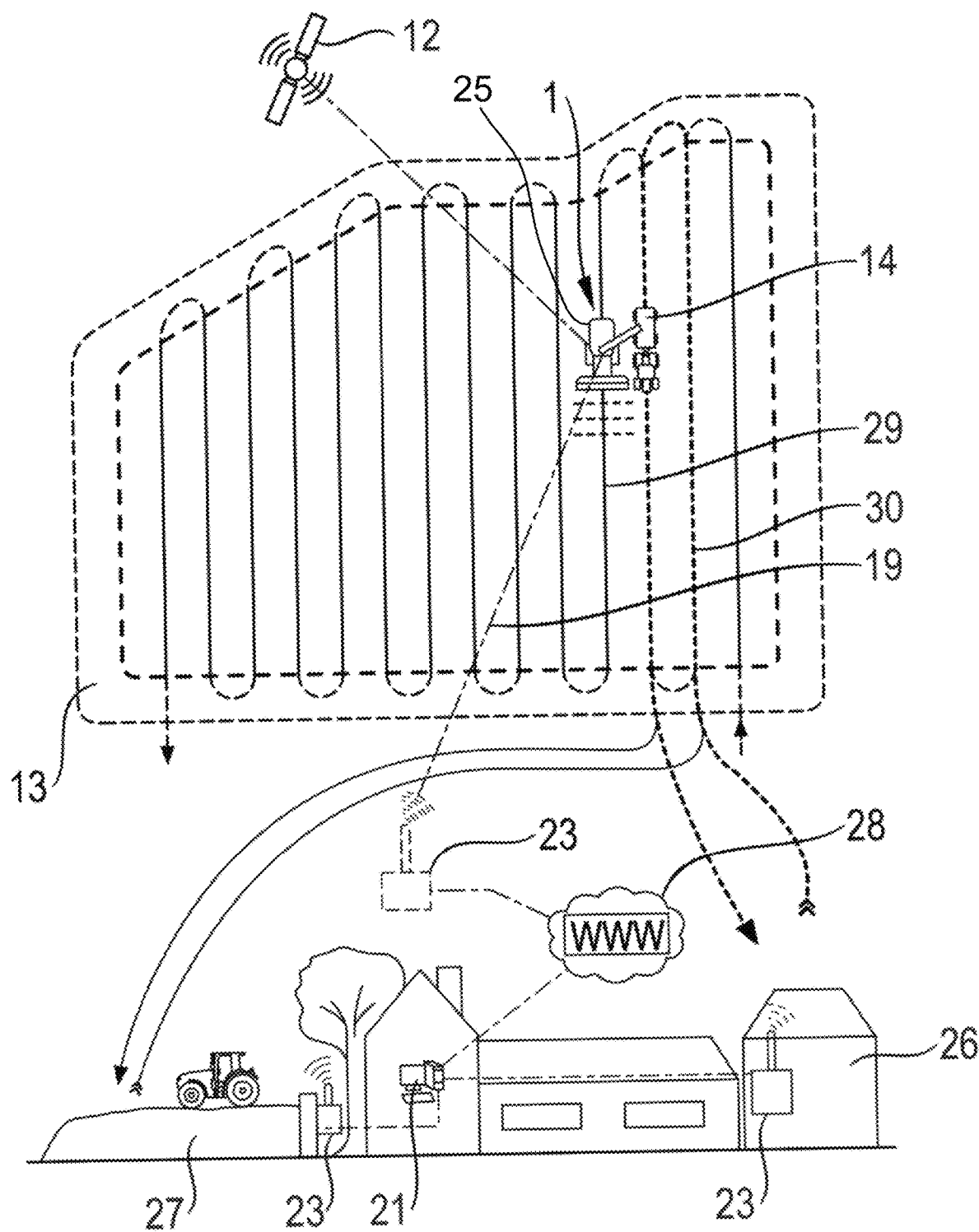
FIG. 3 illustrates an application environment of the agricultural machine.

FIG. 3 shows a typical application situation of the forage harvester 1. The forage harvester 1 harvests a field 13 accompanied by a transport vehicle 14 to which the chopped plant material is transferred continuously using the discharge chute 9. Both the forage harvester 1 and the transport vehicle 14 navigate autonomously or partially autonomously on the field 13 in that they continuously check and correct their position relative to each other and to the preplanned routes 25 with the assistance of the navigation satellites 12. The evaluation unit 15 of the forage harvester is communicatively connected to the data processing unit 21 by the radio interfaces 22, 23. FIG. 3 shows the data processing unit 21 in a farm building of an agricultural farm to which the forage harvester 1 and/or the field 13 belong. In practice, the data processing unit 21 may also be remote from the agricultural farm, for example set up at a service provider, or a network that comprises computers of a plurality of agricultural farms that each supply raw data 19. In one or some embodiments, the radio interface 23 comprises a base station of a public cellular network 28 that supports mobile data traffic, for example via the Internet. The use of a satellite-assisted cellular system is also contemplated. Other radio interfaces 23 connected to the data processing unit 21, for example via LAN, may be provided in a barn 26 in which the forage harvester 1 and/or the transport vehicle 14 are parked during nonuse, or on a silo 27 to which the transport vehicle 14 conveys a chopped plant material from the field 13.

The data processing unit 21 runs a database that stores data of the field areas cultivated by the farm in which inter alia their geographic data, the varieties of plants raised thereupon currently and in the past, fertilization and pesticide measures, etc. are recorded, as well as a library of the calibration models 24. By using the geographic data, the data processing unit 21 may plan the routes 29, 30 of the forage harvester 1 and the transport vehicle 14, and typically transmits them before a harvesting operation starts via the radio interface 23 of the barn 26. If during use on the field 13 an update of the routes 29, 30 is necessary, this may be done using the radio interface 23 of the cellular network 28.

With the knowledge of the variety cultivated on the acreage to be processed, the data processing unit 21 selects, from the library of calibration models 24, the calibration model appropriate for the cultivated variety and transmits it to the evaluation unit 15 of the forage harvester 1. Typically, this transmission is performed using the radio interface 23 of the barn 26; the radio interface 23 of the cellular network 28 may also be used when weather conditions or other unforeseeable events during use force rescheduling, and the downloaded model is no longer appropriate.

NIR spectra obtained during the harvesting operation and any parameter values determined by the evaluation unit 15 may be uploaded via the radio interface 23 of the cellular network 28 to the data processing unit 21; alternatively, the transmission may be performed via the radio interface 23 of the barn 26 after use has ended. It is also contemplated for the forage harvester 1 and the transport vehicle to maintain a WLAN while driving on the field 13 through which the NIR spectra collected by the forage harvester 1 together with the plant material to which they refer are transmitted to a memory of the transport vehicle 14 and, once the memory of the transport vehicle 14 is within the range of a radio interface 23 of the farm, are forwarded thereby to the data processing unit 21. In one instance as well as the other, when a new load of plant material arrives at the silo 27, the data processing unit 21 possesses the NIR spectra belonging to this load that make it possible for the data processing unit 21 to optimally control the compaction of the plant material in the silo 27.

The collected raw data 19 may also remain saved in the data processing unit 21 following an evaluation thereby. This makes it possible to collect NIR spectra from a large number of farms relating to a large number plant varieties that grow in different soils and were cultivated or harvested under a large number of weather conditions in order to create improved calibration models 31 from this comprehensive database or, if a new influencing variable is identified that was previously not considered in the prior art, to develop various calibration models 31 for various possible values of this influencing variable. These may then be transmitted to machines of the connected agricultural farms in order to be used there for the evaluation of the raw data 19; however, they may also be forwarded to third parties 32 such as processors of the plant material to allow them to efficiently monitor the condition of the plant material delivered to them. In addition to the raw data delivered to the agricultural machines, results of analytical values may also be used to create these calibration models 31, said values having been obtained in a manner different than through an NIR sensor, for example by a conventional analysis of the contents of a material sample in the laboratory.

In one or some embodiments, the transmitted raw data 19 may be stored in the data processing unit 21 as long as this is considered useful. Since raw data records obtained over the course of various harvests are accordingly collected on a given field area, they may be evaluated with an equivalent calibration model 24 and may thereby provide information on the development of absolute or relative amounts of the substances of interest in the harvested material over the course of several years. Since calibration models may be used that are more recent than the data to which they refer, high-quality evaluations may also be obtained afterward. Inter alia, quantities of substances in the harvested plant material may accordingly also be determined that were not looked for at the time of obtaining the spectra on which the evaluation was based, or for which sufficiently precise calibration models were not available to determine them at the time of origin of the spectra.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

REFERENCE NUMBERS

1 Forage harvester
2 Harvesting header
3 Roller pair
4 Chopping unit
5 Cutter head
6 Plant
7 Corn cracker 8 NIR sensor
9 Discharge chute
10 Onboard computer
11 Navigation system
12 Navigation satellite
13 Field
14 Transport vehicle
15 Evaluation unit
16 Sensor software
17 Calibration model
18 Control unit
19 Raw data
20 Data memory
21 Data processing unit
22 Radio interface
23 Radio interface
24 Calibration model
25 Route
26 Barn
27 Silo
28 Cellular network
29 Route
30 Route
31 Calibration model
32 Third party
33 Processor
34 Memory
35 Sensor interface
36 Timer

The invention claimed is:

1. An agricultural machine comprising:
a near-infrared (NIR) sensor configured to detect one or more NIR spectra of plant material and output the detected one or more NIR spectra as raw data;
an evaluation unit configured to receive the raw data and to derive at least one parameter of the plant material in real time from the raw data; and
an interface for communication with at least one data processing unit external to the agricultural machine, wherein the interface is configured to transmit the raw data to the at least one data processing unit.

2. The agricultural machine of claim 1, further comprising a control unit configured to control, using the at least one parameter, a processing aggregate of the agricultural machine configured to process the plant material.

3. The agricultural machine of claim 1, wherein the evaluation unit comprises a calibration model in order to derive the at least one parameter; and
wherein the evaluation unit is configured to update or replace the calibration model in order to derive the at least one parameter.

4. The agricultural machine of claim 3, wherein the interface is configured to receive and upload the calibration model to the evaluation unit for updating or replacing the calibration model.

5. The agricultural machine of claim 1, wherein the interface is further configured to transmit, in addition to the raw data, values indicative of the at least one parameter derived from the evaluation unit.

6. The agricultural machine of claim 1, wherein the at least one parameter comprises one or both of water content of the plant material or a parameter representative of maturity of the plant material.

7. The agricultural machine of claim 1, further comprising a timer;
wherein the evaluation unit is further configured to correlate with the NIR spectra with times generated by the timer; and
wherein the interface is configured to transmit the raw data including indications of the NIR spectra and the correlated times generated by the timer to the at least one data processing unit.

8. The agricultural machine of claim 1, further comprising a device for positioning;
wherein the evaluation unit is further configured to correlate with the NIR spectra with locations generated by the device for positioning; and
wherein the interface is configured to transmit the raw data including indications of the NIR spectra and the correlated locations generated by the device for positioning to the at least one data processing unit.

9. The agricultural machine of claim 1, further comprising a timer and a device for positioning;
wherein the evaluation unit is further configured to correlate with the NIR spectra with both times generated by the timer and locations generated by the device for positioning; and
wherein the interface is configured to transmit the raw data including indications of the NIR spectra, the correlated times generated by the timer and the correlated locations generated by the device for positioning to the at least one data processing unit.

10. The agricultural machine of claim 1, further comprising software to encode the raw data into an integrity-protected form; and
wherein the interface is configured to transmit the raw data in the integrity-protected form.

11. The agricultural machine of claim 1, wherein the interface is configured to transmit the raw data via a wireless link.

12. The agricultural machine of claim 11, further comprising a data buffer; and
wherein, responsive to determining that the wireless link is unavailable, at least a part of the raw data is stored in the buffer.

13. A data processing system comprising:
at least one data processing unit; and
at least one agricultural machine external to the at least one data processing unit, the at least one agricultural machine comprising:
an NIR sensor configured to detect one or more NIR spectra of plant material and output the detected one or more NIR spectra as raw data;
an evaluation unit configured to receive the raw data and to derive, using at least one calibration model, at least one parameter of the plant material in real time from the raw data; and
an interface for communication with the at least one data processing unit external to the agricultural machine, wherein the interface is configured to transmit the raw data to the at least one data processing unit;
wherein data processing unit is configured to generate the at least one calibration model configured to derive the at least one parameter of the plant material by using the raw data.

14. The data processing system of claim 13, wherein the data processing system comprises a plurality of agricultural machines; and
wherein the at least one data processing unit is configured to download the at least one calibration model to one of the plurality of agricultural machines.

15. The data processing system of claim 13, wherein the evaluation unit is configured to update or replace the calibration model in order to derive the at least one parameter.

16. The data processing system of claim 15, wherein the data processing unit is configured to generate an updated or replacement calibration model and to transmit the updated or the replacement calibration model to the agricultural machine; and
   wherein the evaluation unit is configured to update the at least one calibration model with the updated or the replacement calibration model.

17. The data processing system of claim 13, wherein the at least one agricultural machine further comprises a device for positioning;
   wherein the evaluation unit is further configured to correlate with the NIR spectra with locations generated by the device for positioning;
   wherein the interface is configured to transmit the raw data including indications of the NIR spectra and the correlated locations generated by the device for positioning to the at least one data processing unit; and
   wherein the at least one data processing unit is configured to, using indications of the NIR spectra and the correlated locations generated by the device for positioning, to perform location-dependent optimization of cultivation measures.

18. The data processing system of claim 13, wherein the at least one agricultural machine further comprises a timer;
   wherein the evaluation unit is further configured to correlate with the NIR spectra with times generated by the timer; and
   wherein the interface is configured to transmit the raw data including indications of the NIR spectra and the correlated times generated by the timer to the at least one data processing unit.

\* \* \* \* \*